(12) United States Patent
Ulmer et al.

(10) Patent No.: US 8,945,447 B2
(45) Date of Patent: Feb. 3, 2015

(54) TIRE INNERLINER

(75) Inventors: James D. Ulmer, Akron, OH (US);
Robert Gibbons Barned, Akron, OH (US); Lisa Marie Dinger, Brunswick, OH (US); Joseph Lanzarotta, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 833 days.

(21) Appl. No.: 12/521,194

(22) PCT Filed: Dec. 28, 2007

(86) PCT No.: PCT/US2007/026390
§ 371 (c)(1),
(2), (4) Date: Jun. 25, 2009

(87) PCT Pub. No.: WO2008/082592
PCT Pub. Date: Jul. 10, 2008

(65) Prior Publication Data
US 2010/0096058 A1    Apr. 22, 2010

Related U.S. Application Data

(60) Provisional application No. 60/877,765, filed on Dec. 29, 2006, provisional application No. 60/967,215, filed on Aug. 31, 2007.

(51) Int. Cl.
*B32B 25/00*    (2006.01)
*B29C 63/00*    (2006.01)
*B60C 7/22*    (2006.01)
(Continued)

(52) U.S. Cl.
CPC .............. *C08K 3/22* (2013.01); *B29D 30/0681* (2013.01); *B60C 1/0008* (2013.01); *B60C 5/14* (2013.01); *C08L 21/00* (2013.01); *C08L 23/283* (2013.01);
(Continued)

(58) Field of Classification Search
None
See application file for complete search history.

(56) References Cited

U.S. PATENT DOCUMENTS 2,955,102 A    10/1960    Clayton et al.
4,616,686 A *  10/1986    Berta ............................. 152/510
(Continued)

FOREIGN PATENT DOCUMENTS

EP    1 500 678 A1    1/2005
EP    1 543 998 A1    6/2005
(Continued)

OTHER PUBLICATIONS

International Preliminary Report on Patentability dated Jul. 9, 2009, PCT/US2007/026390.
(Continued)

*Primary Examiner* — Jeffrey Wollschlager
(74) *Attorney, Agent, or Firm* — Shaun Fox; Arthur M. Reginelli

(57) ABSTRACT

A method of preparing a green tire innerliner, the method comprising mixing one or more vulcanizable rubbery polymers, less than 0.75 parts by weight zinc oxide, less than 0.75 parts by weight magnesium oxide, and less than 0.75 parts by weight sulfur, per 100 parts by weight rubber, to form a vulcanizable mixture and extruding the mixture to form a green tire innerliner.

14 Claims, 1 Drawing Sheet

(51) Int. Cl.
*B60C 9/00* (2006.01)
*B29C 35/00* (2006.01)
*C08K 3/22* (2006.01)
*B29D 30/06* (2006.01)
*B60C 1/00* (2006.01)
*B60C 5/14* (2006.01)
*C08L 21/00* (2006.01)
*C08L 23/28* (2006.01)
*C08L 7/00* (2006.01)

(52) U.S. Cl.
CPC .......... *B29D 2030/0682* (2013.01); *C08L 7/00* (2013.01); *A08L 9/06* (2013.01)
USPC .................. 264/211; 264/171.1; 264/174.11; 264/209.6; 264/211.24; 264/236; 264/331.13; 264/347; 152/203; 152/204; 156/110.1; 156/123

(56) References Cited

U.S. PATENT DOCUMENTS

| | | | |
|---|---|---|---|
| 5,385,980 | A | 1/1995 | Schaefer et al. |
| 5,491,196 | A | 2/1996 | Beers et al. |
| 5,631,316 | A | 5/1997 | Costemalle et al. |
| 5,824,170 | A | 10/1998 | Weston et al. |
| 5,866,171 | A | 2/1999 | Kata |
| 5,876,527 | A | 3/1999 | Tsuruta et al. |
| 5,931,211 | A | 8/1999 | Tamura |
| 5,971,046 | A | 10/1999 | Koch et al. |
| 6,207,764 | B1 * | 3/2001 | Ignatz-Hoover ........... 525/332.6 |
| 6,334,919 | B1 * | 1/2002 | Takeyama et al. ............ 156/123 |
| 7,134,468 | B2 | 11/2006 | Sandstrom |
| 7,294,664 | B2 * | 11/2007 | Jones et al. .................. 524/445 |
| 7,425,591 | B2 | 9/2008 | Dias et al. |
| 2002/0134480 | A1 | 9/2002 | Taguchi et al. |
| 2004/0030036 | A1 | 2/2004 | Waddell et al. |
| 2004/0132894 | A1 * | 7/2004 | Dias et al. ..................... 524/515 |
| 2005/0137314 | A1 * | 6/2005 | Spadone ....................... 524/492 |
| 2006/0000532 | A1 | 1/2006 | Sandstrom |
| 2006/0243371 | A1 * | 11/2006 | Kanenari ...................... 156/123 |
| 2008/0023118 | A1 * | 1/2008 | Tse et al. ...................... 152/510 |

FOREIGN PATENT DOCUMENTS

| | | |
|---|---|---|
| EP | 1 612 242 A2 | 1/2006 |
| JP | 09324069 * | 12/1997 |
| WO | WO 2007 050076 A1 | 5/2007 |
| WO | WO 2008 082592 A2 | 7/2008 |
| WO | WO 2008 082592 A3 | 7/2008 |

OTHER PUBLICATIONS

Gent, A.N. and Lai, S.-M. "Adhesion and Autohesion of Rubber Compounds: Effect of Surface Roughness", Rubber Chemistry and Technology, 68, pp. 13-25.
Gent, A.N. "The Role of Chemical Bonding in the Adhesion of Elastomers", Rubber Chemistry and Technology, 55, pp. 525-535.
Bhowmick, A.K. and Gent, A.N., Effect of Interfacial Bonding on the Self-Adhesion of SBR and Neoprene, Rubber Chemistry and Technology, 57, pp. 216-226.
ExxonMobil Chemical, "Model Vulanization Systems for Butyl Rubber, Halobutyl Rubber, and BIMSM Elastomer", www.exxonmobilchemical.com, 2008, p. 19.
Sartomer Company, Exton, PA, "Elastomer Cure Concepts vol. X", www.sartomer.com, 2006, pp. 11-18.
Winspear, George G., ed., The Vanderbilt Rubber Handbook, R.T. Vanderbilt Company, Inc., NY, NY, 1968, pp. 62-63.
Baranwal, Krishna C., ed., Basic Elastomer Technology, The Rubber Division American Chemical Society, Akron, OH, 2001, pp. 324-327.
Kuntz, et al., "Rubber Chem. Technol." 57 (1984) pp. 813-825.
R.W. Layer and D. W. Chasar, "Rubber Chem. Technol." 67 (1994) pp. 299-313.
R. Vukov, "Rubber Chem. Technol." 57 (1984) pp. 284-290.
P.J. Nieuwenhuizen and J. Reedijk "Rubber Chem. Technol." 70 (1997) pp. 368-429.
A. Y. Coran, Science and Technology of Rubber F.R. Eirich, Ed., Academic Press, New York, 1978, pp. 291-338.
R.L. Zapp and P. Hous, "Rubber Technology Second Edition," M. Morton, Ed., Robert E. Krieger Publishing Company, Mlabar, FL, 1981, pp. 249-273.
D. C. Edwards, "Rubber Chem. Technol." 60 (1987) pp. 62-77.

* cited by examiner

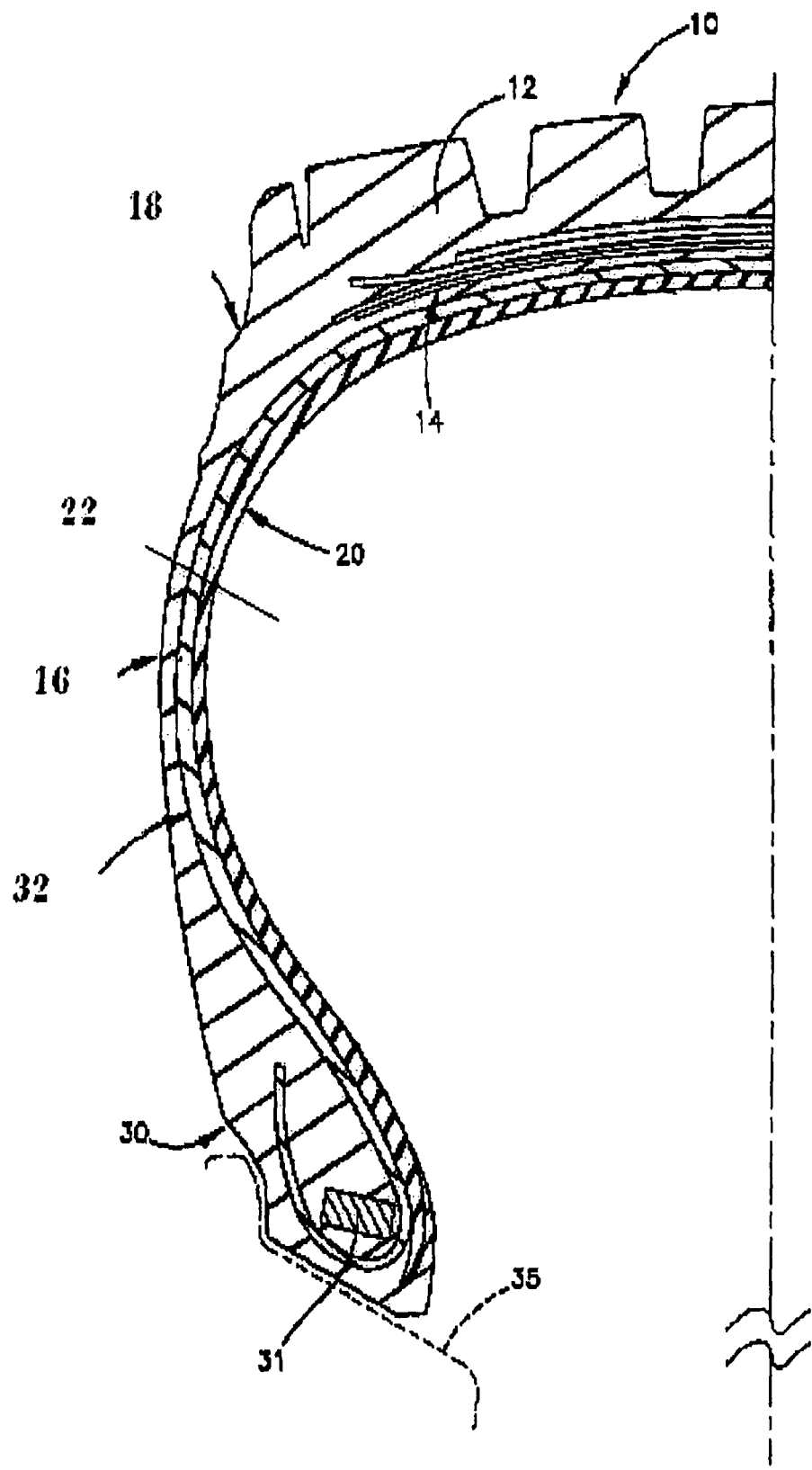

TIRE INNERLINER

This application claims the benefit of U.S. Provisional Patent Application Ser. No. 60/877,765 filed Dec. 29, 2006, and U.S. Provisional Patent Application Ser. No. 60/967,215 filed Aug. 31, 2007, which are incorporated herein by reference.

FIELD OF THE INVENTION

One or more embodiments of this invention relate to tire formulations for innerliners.

BACKGROUND OF THE INVENTION

The inner surface of a pneumatic tire may include an elastomeric composition designed to prevent or retard the permeation of air from the tire's inner air chamber. This elastomeric composition is often referred to as an innerliner. Rubbers, such as butyl and halobutyl rubber, which are relatively impermeable to air, are often used as the primary rubber component in innerliners.

The innerliner may comprise a relatively thin sheet of elastomer that is formulated with compounding additives and a curing system. The elastomer formulation may be laminated to the inner surface of a tire carcass layer of an uncured tire as the tire is formed on a tire building drum. Final cure of the composite structure produces a tire having a cured innerliner adhered to the carcass.

Properties that are desirable for innerliners include good resistance to air permeation, flex resistance, and adhesion to the tire carcass. Low permeability to air is generally achieved through the use of a high mechanical Tg polymer, such as butyl rubber or a halobutyl rubber. The high Tg polymer may be blended with other elastomers such as SBR or natural rubber. Flex resistance and tensile strength will depend, to some degree, on modulus.

Natural and butyl rubber may be vulcanized by using sulfur curative systems. Halobutyl rubber may be cured by using metal oxide curative systems and sulfur cure systems.

Typical amounts reported in the literature for halobutyl rubber or blends of halobutyl rubber with natural rubber are 3 to 5 parts per hundred rubber (phr) zinc oxide, and 0.5 to 1 phr sulfur.

Thus, a method would be desirable for preparing a tire innerliner formulation having a good combination of properties including air permeability, flex resistance, tensile strength elongation, and adhesion. Specifically desirable is a vulcanizable composition including one or more rubbery polymers and a cure system that results in an innerliner formulation with an optimum combination of these properties.

SUMMARY OF THE INVENTION

One or more embodiments of the present invention provides a method of preparing a green tire innerliner, the method comprising mixing one or more vulcanizable rubbery polymers, less than 0.75 parts by weight zinc oxide, less than 0.75 parts by weight magnesium oxide, and less than 0.75 parts by weight sulfur, per 100 parts by weight rubber, to form a vulcanizable mixture and extruding the mixture to form a green tire innerliner.

Other embodiments provide a method of preparing a green tire innerliner, the method comprising mixing a rubber including a halogenated rubber with a cure system including one or more curatives selected from the group consisting of sulfur, magnesium oxide, and zinc oxide to form a vulcanizable mixture, where the molar ratio of the cure system to the moles of crosslinkable pairs on the halogenated rubber is at least 0.1:1 up to 1.8:1; and extruding the mixture to form a green tire innerliner.

Still other embodiments provide a tire comprising an innerliner, where the innerliner includes a rubber composition that is at least partially cured, and where the rubber composition is characterized by a swollen polymer volume fraction ($V_r$) of less than 0.15.

BRIEF DESCRIPTION OF THE DRAWINGS

FIG. 1 is a half cross-sectional view of a tire according to one or more embodiments of this invention.

DETAILED DESCRIPTION OF ILLUSTRATIVE EMBODIMENTS

In one or more embodiments, the present invention provides a method for preparing a tire including an innerliner. Other embodiments relate to innerliner formulations and tires prepared using these innerliner formulations.

An example of a tire according to the present invention is shown in FIG. 1. Tire 10 includes a tread portion 12, a belt package 14, sidewalls 16, shoulder portion 18, innerliner ply 20, cavity 22, and bead portions 30 that include bead core 31. Carcass 32 extends between bead portions 30. Bead cores 31 help to hold bead portions 30 against vehicle rim 35. Pneumatic tires can be made as discussed in U.S. Pat. Nos. 5,866, 171, 5,876,527, 5,931,211, and 5,971,046, which are incorporated herein by reference.

In one or more embodiments, the innerliner may be prepared by conventional calendering or milling techniques to form a strip of uncured compounded rubber of appropriate width which is sometimes referred to as a gum strip. The gum strip may be the first element of the tire applied to a tire building drum, over and around which the remainder of the tire is built. In other embodiments, the innerliner may be incorporated into a subassembly with another tire component before placing it on the drum. When the tire is cured, the innerliner may become an integral, co-cured, part of the tire. Tire innerliners and their methods of preparation are well known to those having skill in the art.

In one or more embodiments, a vulcanizable innerliner composition may be formed into a layer or sheet. As known to those skilled in the art, the layer may be produced by a press or passing a rubber composition through a mill, calender, multihead extruder or other suitable means. In one or more embodiments, the layer is produced by a calender. The uncured layer sheet may then be constructed as an inner surface of an uncured rubber tire structure, which may be referred to as a carcass.

Practice of the present invention does not necessarily impact the thickness of the innerliner. In one embodiment, the innerliner of the present invention has an uncured gum thickness in the range of from about 0.02 to about 0.5 cm, in other embodiments from about 0.03 to about 0.45 cm, in other embodiments from about 0.04 to about 0.4 centimeters, in other embodiments from about 0.05 to about 0.2 cm, and in other embodiments from about 0.08 to about 0.02 cm.

In one or more embodiments, the uncured layer may be co-cured with the tire carcass, as well as with the other components of the tire, during the tire curing operation under conditions of heat and pressure. In one or more embodiments, vulcanization of the tire containing the innerliner of the present invention may be carried out at temperatures of from about 100° C. to about 200° C. In one embodiment, the vulcanization is conducted at temperatures ranging from about 110° C. to about 180° C. Any vulcanization process known in the art may be used, including heating in a press or mold, heating with superheated steam or hot salt, or in a salt bath. In one embodiment, the heating is accomplished in a press or mold. The conditions of cure can be readily selected by those of skill in the art to achieve appropriate cure of the various tire components.

In one or more embodiments, the vulcanized innerliner becomes an integral part of the tire by being co-cured therewith. In one or more embodiments, the innerliner is cured to and is thereby adhered to the adjacent tire component (e.g., carcass) to an extent that the resulting laminate passes industry standards for adhesion such as may be determined by blow point analysis.

In one or more embodiments, the cured innerliner has a thickness ranging from about 0.02 to about 0.35 centimeters. In another embodiment, the cured innerliner has a thickness of from about 0.04 to about 0.15 cm thickness In one or more embodiments, the pneumatic tire with the integral innerliner may be constructed in the form of a passenger tire, truck tire or other type of bias or radial pneumatic tire.

In one or more embodiments, the vulcanizable innerliner composition that is employed to prepare the green tire innerliner discussed above includes a rubber component and a cure system. The vulcanizable innerliner composition may also include other components that are commonly employed in the art of making vulcanizable innerliner compositions.

The cure system may include a multitude of rubber curing agents including, but not limited to, sulfur-based compounds, metal oxide, or peroxide-based curing systems. Vulcanizing agents may be used alone or in combination. Sulfur-based compounds include those compounds conventionally employed in the art of making tires. These compounds may also be referred to as sulfur or sulfur crosslinking agents. In one or more embodiments, sulfur includes free sulfur, which may also be referred to as elemental sulfur, as well as those compounds known in the art to be sulfur donor compounds (e.g. thiurams such as thiuram disulfide).

Curing agents are described in Kirk-Othmer, Encyclopedia of Chemical Technology, 365-468, (3rd Ed. 1982), particularly Vulcanization Agents and Auxiliary Materials, 390-402, A. Y. Coran, Vulcanization in Encyclopedia of Polymer Science and Engineering, (2nd Ed. 1989), Frederick R. Erich, Science and Technology of Rubber, Chapter 7, Academic Press (1978), Robert F. Ohm, The Vanderbilt Rubber Handbook, pp. 92-122 (13th Ed. 1990), Krishna C. Baranwal & Howard L. Stephens, Basic Elastomer Technology, Chapter 9, (1st Ed. 2001), and Maurice Morton, Rubber Technology, Chapter 10, (2nd Ed. 1981), which are incorporated herein by reference.

In one or more embodiments, the cure system includes a sulfur crosslinking agent, zinc oxide, and/or magnesium oxide.

In one embodiment, the vulcanizable composition includes zinc oxide in an amount of from about 0 to about 0.8 parts by weight (pbw) zinc oxide per 100 parts by weight rubber (phr), in other embodiments from about 0.1 to about 0.75 pbw zinc oxide phr, in another embodiments from about 0.2 to about 0.5 pbw zinc oxide phr, and in another embodiments from about 0.25 to about 0.38 pbw zinc oxide phr.

In certain embodiments, the vulcanizable composition includes less than about 0.75 pbw zinc oxide phr, in other embodiments, less than about 0.5 pbw zinc oxide phr, in other embodiments less than about 0.38 pbw zinc oxide phr, in other embodiments less than about 0.3 pbw zinc oxide phr, in other embodiments less than 0.2 pbw zinc oxide phr, in other embodiments less than 0.15 pbw zinc oxide phr, in other embodiments less than 0.10 pbw zinc oxide phr, and in other embodiments less than 0.05 pbw zinc oxide phr. In one embodiment, the vulcanizable composition is devoid of zinc oxide.

In one embodiment, the vulcanizable composition includes magnesium oxide in an amount of from about 0 to about 0.8 pbw magnesium oxide phr, in other embodiments from about 0.1 to about 0.75 pbw magnesium oxide phr, in another embodiment, from about 0.2 to about 0.5 pbw magnesium oxide phr, and in another embodiment, from about 0.25 to about 0.38 pbw magnesium oxide phr.

In certain embodiments, where the vulcanizable composition includes less than about 0.75 pbw magnesium oxide phr, in other embodiments, less than about 0.5 pbw magnesium oxide phr, in other embodiments less than about 0.38 pbw magnesium oxide phr, in other embodiments less than 0.3 pbw magnesium oxide phr, in other embodiments less than 0.2 pbw magnesium oxide phr, in other embodiments less than 0.15 pbw magnesium oxide phr, in other embodiments less than 0.10 pbw magnesium oxide phr, and in other embodiments less than 0.05 pbw magnesium oxide phr. In one embodiment, the vulcanizable composition is devoid of magnesium oxide.

In one embodiment, the vulcanizable composition includes from about 0 to about 0.6 pbw sulfur phr, in another embodiment from about 0.05 to about 0.55 pbw sulfur phr, in another embodiment, from about 0.08 to about 0.25 pbw sulfur phr, and in another embodiment, from about 0.1 to about 0.13 pbw sulfur phr.

In these or other embodiments, the vulcanizable composition includes less than about 0.75 pbw sulfur phr, in other embodiments less than 0.6 pbw sulfur phr, in other embodiments less than 0.55 pbw sulfur phr, in other embodiments less than about 0.45 pbw sulfur phr, in other embodiments less than about 0.40 pbw sulfur phr, in other embodiments less than about 0.35 pbw sulfur phr, in other embodiments less than about 0.25 pbw sulfur phr, in other embodiments less than about 0.13 pbw sulfur phr, in other embodiments less than about 0.10 pbw sulfur phr, in other embodiments less than about 0.07 pbw sulfur phr, and in other embodiments less than about 0.05 pbw sulfur phr. In one embodiment, the vulcanizable composition is devoid of sulfur.

In one or more embodiments, reference may be made to the total curative loading within the vulcanizable innerliner compositions. This total curative loading refers to the total amount of sulfur crosslinking agents and metal oxide crosslinking agents including zinc oxide and magnesium oxide. In one or more embodiments, the total curative loading within the innerliner vulcanizable compositions of the present invention is from about 0.05 to about 1.5 phr. In these or other embodiments, the total curative loading within the innerliner vulcanizable compositions is less than 1.8 pbw curative phr, in other embodiments less than 1.5 pbw curative phr, in other embodiments less than 1.3 pbw curative phr, in other embodiments less than 1.2 pbw curative phr, in other embodiments less than 1.1 pbw curative phr, in other embodiments less than 1.0 pbw curative phr, in other embodiments less than 0.9 pbw curative phr, and in other embodiments less than 0.8 pbw curative phr.

In one or more embodiments, the amount of zinc oxide may be calculated based upon the number of halogen atoms present in the vulcanizable innerliner composition. In one or more embodiments, the number of halogen atoms present in the vulcanizable innerliner composition represents those halogen atoms attached to a halogenated rubber. More specifically, in one embodiment, the number of zinc oxide molecules present is approximately equal to one-half of the number of halogen atoms present in the vulcanizable innerliner composition. One of skill in the art can calculate the weight of zinc oxide to be added based upon well known information including molecular weight and Avogadro's number.

In one or more embodiments, the amount of sulfur crosslinking agent may be calculated based upon the number of double bonds in the vulcanizable innerliner composition. More specifically, the number of sulfur crosslinking agent molecules present is approximately equal to one-half of the number of double bonds present in the vulcanizable innerliner composition. The number of double bonds may be determined by methods known in the art. One of skill in the art can calculate the weight of sulfur crosslinking agent to be added based upon well known information including molecular weight and Avogadro's number.

In one or more embodiments, reference may be made to a stoichiometric equivalent of curative. This amount of curative is a theoretical curative required to fully crosslink the rubber by consuming all available crosslink sites. Inasmuch as a crosslink is formed between two crosslink sites, one molecule of crosslinking agent reacts with a pair of crosslink sites to form a crosslink. Stated another way, a ratio of one molecule of curative to one pair of crosslink sites is theoretically required to consume all crosslink sites.

In one or more embodiments, the vulcanizable rubber employed in preparing the innerliner composition is a halobutyl rubber, which includes a halogen atom and a double bond at each respective crosslink site. Accordingly, the crosslink site can be reacted with a metal oxide or a sulfur curative. Where the vulcanizable rubber includes natural rubber, the crosslink site includes a double bond, which can be reacted with a sulfur curative. Thus, where the vulcanizable rubber includes halo-butyl rubber exclusively, the stoichiometric equivalent of curative will be based upon the metal oxide and the sulfur. Where the vulcanizable rubber includes both halo-butyl rubber and natural rubber, the stoichiometric equivalent of sulfur can be apportioned between the natural rubber and the halo-butyl rubber.

Inasmuch as the rubber employed in preparing the tire innerliner composition of the present invention include unsaturated rubber and/or halogenated rubber, those skilled in the art will appreciate that a double bond within the unsaturated rubber is a crosslink site for a sulfur curative, which can form a sulfur-containing crosslink between a pair of double bonds. Likewise, the halogen atom or a halogen atom of a halogenated rubber is a crosslink site for metal oxides such zinc oxide or magnesium oxide, which upon cleaving the halogen atom a direct crosslink is formed between two crosslink sites.

In one or more embodiments where the vulcanizable rubber includes both natural rubber and halogenated butyl rubber, less than 100% by weight of the stoichiometric equivalent of curative is employed in preparing the vulcanizable compositions of the present invention. That is, less than 1 molecule of curative is employed per ½ the total number of cure sites within the rubber to be vulcanized. In one or more embodiments, less than 90%, in other embodiments less than 80%, in other embodiments less than 70%, in other embodiments less than 60%, in other embodiments less than 50%, in other embodiments less than 40%, in other embodiments less than 30% in other embodiments less than 20%, and in other embodiments less than 10% of the stoichiometric equivalent of curative is employed in preparing the vulcanizable innerliner compositions of the present invention.

In one or more embodiments where the vulcanizable rubber includes halogenated butyl rubber, less than 180% by weight of the stoichiometric equivalent of curative is employed in preparing the vulcanizable compositions of the present invention. That is, less than 1.8 molecule of curative is employed per ½ the total number of cure sites within the rubber to be vulcanized. In one or more embodiments, less than 180%, in other embodiments less than 170%, in other embodiments less than 160%, in other embodiments less than 150%, in other embodiments less than 140%, in other embodiments less than 130%, in other embodiments less than 120% in other embodiments less than 110%, and in other embodiments less than 100% of the stoichiometric equivalent of curative is employed in preparing the vulcanizable innerliner compositions of the present invention.

In one or more embodiments, it has advantageously been discovered that the total level of curative (e.g. sulfur, MgO, and ZnO) employed in the vulcanizable innerliner compositions can be determined with reference to the number of halogen atoms in the halogenated (e.g. halobutyl) rubber component. This technique for determining the total level of curative can be employed in those vulcanizable compositions where the rubber component includes 100% by weight halogenated rubber or where the rubber component includes a blend of halogenated rubber and non-halogenated rubber. Where the rubber component includes a blend, it has been discovered that the level of curative can be determined without reference to the non-halogenated rubber other than to account for apportionment of the curative between the halogenated and non-halogenated rubber, which is determined on a weight basis based upon the relative weight percentages of the halogenated and non-halogenated rubber. In more embodiments, this technique is useful for vulcanizable compositions that include a rubber component including at least 50% by weight, in other embodiments at least 60% by weight, in other embodiments at least 70% by weight, in other embodiments at least 80% by weight, and in other embodiments at least 90% by weight halogenated rubber (e.g. halobutyl rubber) based on the total weight of the rubber component.

According to these embodiments, and in a manner generally consistent with those embodiments described above, a molar ratio is determined between the moles of curative and the moles of crosslinkable pairs on the halogenated rubber. The moles of crosslinkable pairs, which may also be referred to as potential crosslinks, include two moles of crosslink sites per potential mole of crosslink or crosslinkable pair. As discussed above, the crosslink sites within the halogenated rubber include a double bond and a halogen atom. Because each site has dual functionality, a crosslink can be formed with either sulfur or the metal oxide. Since the number of double bonds within the halogenated rubber is equivalent to the number of halogen atoms (at least for fully halogenated rubbers), the total number of crosslink sites can be determined simply from the total number of halogen atoms. The total number of halogen atoms, of course, can be determined stoichiometrically based on the weight of the halogen. Since two crosslink sites form a crosslinkable pair or potential crosslink, the moles of crosslinkable pairs or crosslinks is ½ the total number halogen atoms. Surprisingly, these calculations have proven to be useful even though a number of assumptions are made such as the apportionment of the curative, that only one sulfur atom participates in each crosslink, and that only one crosslink is formed at each pair of sites even though the sites have dual functionality and can theoretically form two crosslinks, as well other assumptions that are readily apparent to those of skill in the art.

Therefore, within these embodiments, the molar ratio of the total curative (i.e. moles of sulfur, MgO, and ZnO) to the moles of crosslinkable pairs or potential crosslinks of the halogenated polymer, may be up to 1.8:1, in other embodiments up to 1.7:1, in other embodiments up to 1.6:1, in other embodiments up to 1.5:1, in other embodiments up to 1.4:1, in other embodiments up to 1.3:1, in other embodiments up to 1.2:1, in other embodiments up to 1.1:1, in other embodiments up to 1.0:1, in other embodiments up to 0.9:1, in other embodiments up to 0.8:1, and in other embodiments up to 0.7:1. In these or other embodiments, the molar ratio of total curative to the moles of crosslink pairs of the halogenated polymer may be at least 0.05:1, in other embodiments at least 0.1:1, in other embodiments at least 0.2:1, in other embodiments at least 0.3:1, in other embodiments at least 0.4:1, and in other embodiments at least 0.5:1.

In these or other embodiments, the amount of total curative employed (e.g., sulfur, zinc oxide, and magnesium oxide) may be an amount sufficient to achieve a level of cure that can be characterized by a particular swollen polymer volume fraction ($V_r$) of the cured innerliner composition. As those skilled in the art appreciate, $V_r$ is directly related to the level of cure such that, for example, $V_r$ decreases as the level of cure decreases. In one or more embodiments, the total amount of curative employed to make the innerliner compositions of the present invention includes that amount of curative or less to achieve a maximum $V_r$ of a cured innerliner sample of less than 0.15, in other embodiments less than 0.14, in other embodiments less than 0.13, in other embodiments less than 0.12, in other embodiments less than 0.11, in other embodiments less than 0.10, in other embodiments less than 0.9, in other embodiments less than 0.8, in other embodiments less than 0.7, in other embodiments less than 0.6, and in other embodiments less than 0.5.

In one or more embodiments, the polymer volume fraction ($V_r$) may be determined by placing a cured rubber specimen in a solvent to thereby swell the rubber, and then the weight of the swollen rubber is measured after a specified amount of time. After the swollen rubber is weighed, the specimen is dried to remove the solvent and weighed again. One particular method that may be employed includes placing a rubber specimen weighing about 1-1.5 g in a two-ounce jar. The weight of the specimen is determined within 0.0001 gram before being placed in the jar. Cyclohexane is added to the jar until the jar is about 66% full. The jar is then sealed. After 24 hours, the cyclohexane imbibed by the rubber is removed and replaced by fresh cyclohexane. The specimen is allowed to soak in the replacement cyclohexane for at least 48 additional hours. After a total of 72 hours or more, the cyclohexane is poured from the jar while allowing the specimen to remain in the jar. The jar is then resealed while the specimen is transported to a balance, the specimen is removed from the jar, its surface is lightly blotted with a paper towel, the specimen is placed into a teared weighing dish, and the swollen sample is weighed to the nearest 0.0001 g. After weighing, the specimen is placed in an aluminum dish and allowed to air dry for 1-2 hours. The specimen is then placed in a vacuum oven at 50° C. to achieve constant weight in about 24 hours or more. The specimen is then weighed and recorded as the dried weight.

With these measurements, $V_r$ can be calculated based on the following. First, the weight fraction of solubles within a particular sample is calculated from the rubber formula (i.e. based upon the components within the rubber formulation in question). Soluble materials within the formulation include oil and hydrocarbon resin. Those skilled in the art will be able to recognize other materials in various formulations that may be soluble. From this weight fraction, the amount of potentially soluble polymer is excluded. Next, one calculates the theoretical dried specimen weight, which is equal to the original specimen weight before swelling multiplied by (1—the weight fraction of solubles). Then, the excess soluble weight taken as soluble polymer is calculated by subtracting the actual dried specimen weight from the theoretical dried specimen weight after swelling. The amount of soluble polymer after swelling as a fraction of the total compound is determined based upon the excess soluble weight divided by the original specimen weight before swelling. The original polymer weight fraction of the compound is calculated as the original parts per 100 rubber of polymer divided by the parts per 100 rubber of total compound. The insoluble polymer weight fraction in the compound (before swelling) may then be determined by subtracting the soluble polymer weight fraction in the compound from the original polymer weight fraction in the compound. It should be appreciated that the polymer weight in the dried compound after swelling is equal to the insoluble polymer weight in the swollen compound. This value can be determined by multiplying the original specimen weight by the insoluble polymer weight fraction in the compound. It should also be appreciated that the polymer volume in the dried compound is equal to the polymer volume in the swollen compound. For a sample containing one polymer, this is equal to the polymer weight in the dried compound divided by the polymer density. For a two polymer blend, the polymer volume in the dried compound is equal to the weight fraction of the first polymer in the original sample before swelling divided by the density of the first polymer plus the weight fraction of the second polymer in the original sample before swelling divided by the density of the second polymer, and the sum is multiplied by the polymer weight in the dried sample. For example, the density of brominated butyl rubber (BIIR) is taken as 0.93 g/ml and natural rubber as 0.92 g/ml. The solvent weight in the swollen polymer can be determined by subtracting the dried sample weight from the swollen sample weight. The volume of solvent in a swollen sample can be determined by dividing the solvent weight by the solvent density where the density of cyclohexane is taken as 0.774 g/ml. Ultimately, $V_r$ is the volume of polymer in a dried sample divided by the sum of the volume of polymer in the dried sample plus the volume of solvent in a swollen sample. As is known in the art, the averaging of multiple trials can be used to increase the precision of the testing. For blends containing more than two polymers, the volume of the rubber is calculated as with two polymers except with the addition of terms giving the ratio of the "nth" polymer to its own density.

In one or more embodiments, the rubber component of the vulcanizable innerliner composition may include one or more polymers that are capable of being crosslinked or vulcanized; these polymers may be referred to as rubbery polymers or elastomers. In one or more embodiments, the rubbery polymers are selected based upon their properties of low permeability to gases, good vibration damping, good heat, chemical, ozone, and oxidation resistance. In one or more embodiments, the vulcanizable innerliner compositions may include isobutylene-based elastomers. These elastomers may be used alone or in conjunction with other elastomers. The other elastomers may include natural and synthetic elastomers.

Isobutylene-based elastomers include polyisobutylene homopolymers, isobutylene/isoprene copolymers, and halogenated derivatives thereof. Iso-butylene-based elastomers further include halogenated isobutylene-p-methylstyrene copolymers. Iso-butylene-based elastomers and their halogenated derivatives are sometimes referred to as "butyl rubber" and "halobutyl rubber," respectively.

Commercially available butyl rubber includes poly(methylpropene-co-2-methyl-1,3 butadiene) and poly(isobutylene-co-isoprene).

In one or more embodiments, the butyl rubber is prepared by copolymerizing butylene and isoprene. The relative amounts of these monomers will determine the mole percent unsaturation of the resulting copolymer. In other words, the mole percent of isoprene in the copolymerization will correspond to the mole percent unsaturation in the copolymer. In one or more embodiments, the iso-butylene-based elastomer may have a mole percent unsaturation of less than about 3, in other embodiments, less than about 2.5, and in other embodiments, less than about 2.

Halobutyl rubber may include chlorobutyl rubber (CIIR), bromobutyl rubber (BIIR), or mixtures thereof. In one or more embodiments, the halobutyl rubber may include from about 0.5 to about 5 percent by weight halogen atom, in other embodiments from about 0.7 to about 4 percent by weight halogen atom, and in other embodiments from about 1 to about 3 percent by weight halogen atom, based upon the total weight of the halobutyl rubber.

In one or more embodiments, the rubber component of vulcanizable composition includes from about 60 to about 100 percent by weight, or in other embodiments from about 80 to about 100 percent by weight halobutyl rubber. In other embodiment from 80 to about 100 phr halobutyl rubber is employed in the rubber component. In one or more embodiments, at least 80% by weight, in other embodiments at least 90% by weight, in other embodiments at least 95% by weight, and in other embodiments at least 99% by weight of the rubber component of the vulcanizable composition includes a halogenated rubber (e.g. halobutyl rubber).

In one or more embodiments, the vulcanizable composition further includes natural rubber. In one embodiment, natural rubber is present in an amount of from about 0 to about 60 percent by weight (wt. %) of the total rubber component of the formulation, and in other embodiments from about 0 to about 40 percent by weight, and in other embodiments from about 0 to about 20 percent by weight of the total rubber component. In another embodiment, from about 5 to about 50 percent by weight (wt. %) of the rubber component of the formulation is natural rubber.

In one or more embodiments, vulcanizable compositions employed in the present invention include both halo-butyl rubber and natural rubber. In one or more embodiments, the weight ratio of halo-butyl rubber to natural rubber may be at least 1:1, in other embodiments at least 2:1, in other embodiments at least 4:1, in other embodiments at least 7:1, in other embodiments at least 8:1, in other embodiments at least 8.5:1, and in other embodiments at least 9.0:1. In these or other embodiments, the weight ratio of halo-butyl rubber to natural rubber may be less than 9.8:1, in other embodiments less than 9.5:1, and in other embodiments less than 9.0:1.

In one or more embodiments, the vulcanizable rubber compositions include process returns, which include rubber scraps obtained from various sources within a manufacturing facility. In one embodiment, process returns may represent from about 0 to about 50 (or in other embodiments from about 5 to about 25) percent by weight (wt. %) of the total rubber component of the vulcanizable composition.

In one or more embodiments, the vulcanizable innerliner compostions may include synthetic polymers such as, but not limited to, synthetic polyisoprene, polybutadiene, polyisobutylene-co-isoprene, neoprene, poly(ethylene-co-propylene), poly (styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, and epichlorohydrin rubber. In one or more embodiments, these synthetic polymers may be used alone as the rubber to form the rubber component of the vulcanizable composition. In other embodiments, they may be used together with the isobutylene-based rubber to form the rubber component of the vulcanizable composition. In other embodiments, the synthetic polymers may be used in conjunction with the isobutylene-based polymer and the natural rubber to form the rubber component of the vulcanizable composition.

Other ingredients that may be employed include accelerators, oils, waxes, scorch inhibiting agents, processing aids, zinc oxide, tackifying resins, reinforcing resins, fatty acids such as stearic acid, peptizers, antiozonants, and one or more additional rubbers.

Fillers that may be employed include inorganic and organic fillers. The organic fillers may include carbon black and starch. The inorganic fillers may include silica, aluminum hydroxide, magnesium hydroxide, clays (hydrated aluminum silicates), chemically functionalized clays, and mixtures thereof. In particular embodiments, the filler includes a non-reinforcing or coarse carbon black. As is known in the art, these carbon black fillers may be those generally classified as coarser than N300 series black per ASTM D-1765 (e.g. N550). In one or more embodiments, the vulcanizable innerliner compositions include total filler levels from about 30 to about 100 pbw, in other embodiments from about 50 to about 80 pbw, and in other embodiments from about 55 to about 75 pbw phr.

The compositions of this invention can be prepared by employing conventional formulation techniques. In one or more embodiments, the rubber mixture may be prepared by forming an initial masterbatch that includes the rubber component and filler. This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients can be added during these remills. Rubber compounding techniques and the additives employed therein are disclosed in Stephens, The Compounding and Vulcanization of Rubber, in Rubber Technology (2nd Ed. 1973).

In one or more embodiments, tire innerliners prepared according to the method of the present invention have a good combination of properties including air permeability, flex resistance, tensile strength and adhesion.

In one or more embodiments, the oxygen permeability of a tire innerliner prepared according to the present invention is the same as or slightly increased when compared to the oxygen permeability of a tire innerliner prepared by using higher amounts of curatives.

In one or more embodiments, the adhesion of a tire innerliner prepared according to the present invention is surprisingly comparable to the adhesion of innerliners prepared with excess curative as was practiced in the prior art. In particular embodiments, the adhesion of a tire innerliner prepared according to the present invention is increased when compared to the adhesion of a tire innerliner prepared by using higher amounts of curatives.

In one or more embodiments, the fatigue life of a tire innerliner prepared according to the present invention is increased when compared to the fatigue life of a tire innerliner prepared by using higher amounts of curatives such as disclosed in the prior art. Surprisingly, the improved fatigue life was obtained without a technologically deleterious impact on adhesion.

EXPERIMENTAL

Samples 1-10

Various rubber compositions, which may also be referred to as innerliner formulations, were prepared, cured, and tested for characteristics believed to be important in innerliners. Each formulation included 100 parts by weight (pbw) rubber, 60 pbw carbon black, eight pbw processing oil, two pbw stearic acid, seven pbw hydrocarbon resin, four pbw phenolic resin, and 1.25 pbw cure accelerator phr. The level of sulfur, zinc oxide, and magnesium oxide were varied as set forth within the following tables. Also, the tables indicate the type of rubber employed. The rubbers employed included halobutyl rubber having about 2 wt % halogenation (BIIR), natural rubber (NR), and/or synthetic poly (styrene-co-butadiene) (SBR). The amounts for the ingredients as set forth in the table are reported in parts by weight.

Each formulation was prepared within a laboratory-scale internal mixer using conventional two-stage mixing techniques commonly employed in the art of making rubber formulations for tire components. In general, the zinc oxide, sulfur, and cure accelerators were introduced and mixed into the formulation within the second mix stage, which was conducted at temperatures below which would otherwise cause a deleterious initiation of vulcanization.

The formulation was then sheeted on a two-roll mill to a thickness of about 0.075 inch or as otherwise required for particular molds for particular tests. For certain tests, the sheets were cured within a hydraulic press for 55 minutes at 300° F. Depending on the test specifications, test specimens were dye-cut to the desired shapes. In the case of adhesion testing, the cure was effected once the samples were constructed.

Table 1 provides the specifics for the formulations employed in samples 1-10, as well as the results of the tests that were performed.

Fatigue to failure testing (f2f) was performed using a Monsanto "Fatigue to Failure" tester with a number 24 cam operating a 100 cycles per minute with modification to the test samples to accelerate testing. The test specimens were about 3 inches in length, about 0.5 inches wide at their widest width, and about 0.06 inches thick. The specimens were generally dumbbell or dog bone shaped with a central test region of about 1.13 inches in length and about 0.13 inch wide. The edges of the sample (along the 0.5 inch edge) included a rib having a generally circular cross-section extending along the edge to help ensure that the sample would be adequately held within the testing device. The tests were accelerated by gluing rectangular sheets of Mylar™ (0.5 inch×1 inch) on both sides of the sample at the location where the testing device grips the sample approximate to the rib. In other words, four sheets of Mylar™ per sample were applied, two on the top side and two on the top side. Attachment of the Mylar™ sheets effectively reduced the 1.13 inch test area to about 0.5 inch in length.

The oxygen permeability ($O_2$ perm) was performed by using a Mocon™ Oxtran 2/61 testing machine employing procedures similar to ASTM D-3985. In general, a sample of the cured rubber (about 0.03 inch thick) is employed to form a barrier between two gas zones or chambers. A first chamber, which is at 65° C., includes zero-grade air blown across one side of the rubber sample at 125 ml/min. The other chamber, which is likewise set at 65° C., includes a mixture of nitrogen and hydrogen (2%) blown across the rubber sample at 35 ml/min. Oxygen sensors positioned within the chamber including the nitrogen/hydrogen blend detect the level of oxygen penetrating through the rubber sample. The amount of oxygen detected is reported as volume per unit length per time represented as $cm^3/cm \cdot sec$, which is equivalent to $cm^2/sec$.

Adhesion testing was performed by constructing test samples that were about one inch wide by about four inch long. The test sample was a five-layered sample that included a backing layer (which was a calendared textile) adjacent to a test layer, which was sheeted from the sample formulations, adjacent to a mesh fabric, adjacent to a sheeted piece of rubber deriving from a rubber formulation modeled after a body ply formulation, adjacent to a backing layer that was a calendared textile similar to the backing layer directly adjacent to the sample rubber formulation. This laminate structure, which included two layers of green (i.e. uncured) rubber was cured within a hydraulic press for 55 minutes at 300° F. The layer representing the sample innerliner layer and the layer representing the body ply were pulled apart at a pull rate of 50.8 mm per minute. The force to pull the layers apart (separation of which occurred at the mesh layer) was recorded in energy per unit area of surface, which is pound-inches per square inch, which is equivalent to pounds per inch. Testing was conducted at 25 C and 100 C.

Table 1 also provides the molar ratio of total curative (zinc oxide, sulfur, and magnesium oxide, excluding accelerator) to the molar ratio of cure sites within the BIIR. As discussed

TABLE 1

| | Phr | | | | | | f2f | Adhesion | | | | |
|---|---|---|---|---|---|---|---|---|---|---|---|---|
| Samples | BIIR | NR | SBR | MgO | ZnO | S | (kcycles) | 25 C. | 100 C. | $O_2$ perm. | Molar Ratio | $V_r$ | M100 (MPa) |
| 1 | 85 | 15 | — | 0.111 | 0.19 | 0.060 | 2,142 | — | — | — | 0.530 | 0.063 | — |
| 2 | 85 | 15 | — | 0.111 | 0.19 | 0.130 | 858 | 60.4 | 43.7 | 23.6 | 0.696 | 0.071 | 0.946 |
| 3 | 85 | 15 | — | 0.111 | 0.19 | 0.500 | 168 | 51.0 | 32.3 | 24.8 | 1.574 | 0.109 | 1.25 |
| 4 | 60 | 40 | — | 0.111 | 0.19 | 0.500 | 167 | 64.7 | 25.3 | 37.9 | 1.574 | 0.068 | 0.758 |
| 5 | 85 | — | 15 | 0.111 | 0.19 | 0.500 | 535 | 45.0 | 27.9 | 24.0 | 1.574 | 0.103 | 0.917 |
| 6 | 100 | — | — | 0.111 | 0.19 | 0.500 | 12.4 | 48.6 | 25.1 | 17.0 | 1.574 | 0.106 | 0.870 |
| 7 | 85 | 15 | — | 0.111 | 1.5 | 0.500 | 4.21 | 50.9 | 33.3 | 20.2 | 2.799 | 0.144 | 1.55 |
| 8 | 60 | 40 | — | 0.111 | 1.5 | 0.500 | 1.76 | 54.4 | 42.1 | 33.8 | 2.799 | 0.119 | 1.10 |
| 9 | 85 | — | 15 | 0.111 | 1.5 | 0.500 | 0.266 | 44.4 | 17.9 | 20.4 | 2.799 | 0.151 | 1.40 |
| 10 | 100 | — | — | 0.111 | 1.5 | 0.500 | 0.166 | 54.1 | 23.0 | 13.5 | 2.799 | 0.151 | 1.16 | within this specification, where the rubber component included multiple rubbers, an assumption was made that the amount of curative apportioned to the BIIR was equivalent to the weight ratio of BIIR to the other rubber components (e.g. natural rubber and styrene-butadiene rubber). For example, for a sample including 60% BIIR and 40% natural rubber, 60% of the curative, based upon weight, was apportioned to the BIIR.

Table 1 also provides the crosslink density of the cured rubber samples based upon a polymer volume fraction ($V_r$) determined using the procedures set forth herein above. 100 percent modulus was determined on unaged samples at room temperature similar ASTM D-412.

Samples 11-16

Six additional samples set forth in Table 2 were prepared using procedures similar to that set forth for samples 1-10 above. The level of zinc oxide was held at 0.38 pbw phr for these samples. Testing was conducted using procedures that were also consistent with that set forth for samples 1-10 above.

TABLE 2

| | | | Phr | | | f2f | Adhesion | | | | | |
|---|---|---|---|---|---|---|---|---|---|---|---|---|
| Samples | BIIR | NR | SBR | MgO | ZnO | S | (kcycles) | 25 C. | 100 C. | $O_2$ perm. | Molar Ratio | $V_r$ | M100 (MPa) |
| 11 | 85 | 15 | — | 0.111 | 0.38 | 0.060 | 165 | 54.7 | 38.5 | 23.4 | 0.707 | 0.086 | 0.811 |
| 12 | 85 | 15 | — | 0.111 | 0.38 | 0.130 | 43.3 | 54.3 | 35.6 | 25.0 | 0.874 | 0.099 | 0.836 |
| 13 | 85 | 15 | — | 0.111 | 0.38 | 0.250 | 33.7 | 65.7 | 36.1 | 24.8 | 1.158 | 0.109 | 0.909 |
| 14 | 85 | 15 | — | 0.111 | 0.38 | 0.500 | 19.3 | 54.1 | 33.0 | 24.1 | 1.752 | 0.123 | 0.967 |
| 15 | 85 | 15 | — | 0.111 | 0.38 | 2.000 | 5.00 | 49.2 | 28.4 | 22.8 | 5.312 | 0.148 | 1.141 |
| 16 | 85 | 15 | — | 0.111 | 1.5 | 0.500 | 1.13 | 62.3 | 35.5 | 21.6 | 2.799 | 0.152 | 1.294 |

Samples 17-21

Five additional samples set forth in Table 3 were prepared using procedures similar to that set forth for samples 1-10 above. The level of zinc oxide was held at 0.75 pbw phr for these samples. Testing was conducted using procedures that were also consistent with that set forth for samples 1-10 above.

TABLE 3

| | | | phr | | | f2f | Adhesion | | | | | |
|---|---|---|---|---|---|---|---|---|---|---|---|---|
| Samples | BIIR | NR | SBR | MgO | ZnO | S | (kcycles) | 25 C. | 100 C. | $O_2$ perm. | Molar Ratio | $V_r$ | M100 (MPa) |
| 17 | 85 | 15 | — | 0.111 | 0.75 | 0.060 | 93.7 | 58.5 | 37.81 | 23.6 | 1.053 | 0.102 | 0.826 |
| 18 | 85 | 15 | — | 0.111 | 0.75 | 0.130 | 40.7 | 58.6 | 39.85 | 23.8 | 1.220 | 0.109 | 0.864 |
| 19 | 85 | 15 | — | 0.111 | 0.75 | 0.500 | 23.8 | 52.1 | 36.08 | 23.3 | 2.098 | 0.127 | 0.945 |
| 20 | 85 | 15 | — | 0.111 | 0.75 | 2.000 | 1.33 | 45.1 | 30.04 | 21.1 | 5.658 | 0.157 | 1.139 |
| 21 | 85 | 15 | — | 0.111 | 1.5 | 0.500 | 0.960 | 52.2 | 35.95 | 22.2 | 2.799 | 0.146 | 1.209 |

Samples 22-33

Twelve additional samples set forth in Table 4 were prepared using procedures similar to that set forth for samples 1-10 above. The level of zinc oxide was held at 1.5 pbw phr and the level of magnesium oxide was held at 0.111 pbw phr for these samples. Testing was conducted using procedures that were also consistent with that set forth for samples 1-10 above.

TABLE 4

| | | | phr | | | F2f | Adhesion | | | | | |
|---|---|---|---|---|---|---|---|---|---|---|---|---|
| Samples | BIIR | NR | SBR | MgO | ZnO | S | (kcycles) | 25 C. | 100 C. | $O_2$ perm. | Molar Ratio | $V_r$ | M100 (MPa) |
| 22 | 85 | 15 | — | 0.111 | 1.5 | 0.130 | 11.5 | 57.0 | 40.3 | 21.4 | 1.921 | 0.113 | 1.22 |
| 23 | 85 | 15 | — | 0.111 | 1.5 | 0.500 | 4.21 | 50.9 | 33.3 | 20.2 | 2.799 | 0.144 | 1.55 |
| 24 | 85 | 15 | — | 0.111 | 1.5 | 2.00 | 0.136 | 48.7 | 27.1 | 18.2 | 6.359 | 0.182 | 2.23 |
| 25 | 60 | 40 | — | 0.111 | 1.5 | 0.130 | 13.6 | 77.3 | 47.7 | 36.4 | 1.921 | 0.088 | 0.93 |
| 26 | 60 | 40 | — | 0.111 | 1.5 | 0.500 | 1.76 | 54.4 | 42.1 | 33.8 | 2.799 | 0.119 | 1.10 |
| 27 | 60 | 40 | — | 0.111 | 1.5 | 2.00 | 2.89 | 55.9 | 38.8 | 33.0 | 6.359 | 0.161 | 1.50 |
| 28 | 85 | — | 15 | 0.111 | 1.5 | 0.130 | 7.49 | 52.8 | 37.8 | 21.0 | 1.921 | 0.110 | 1.06 |
| 29 | 85 | — | 15 | 0.111 | 1.5 | 0.500 | 0.266 | 44.4 | 17.9 | 20.4 | 2.799 | 0.151 | 1.40 |
| 30 | 85 | — | 15 | 0.111 | 1.5 | 2.000 | 0.000 | 36.1 | 19.3 | 19.2 | 6.359 | 0.208 | 2.31 |
| 31 | 100 | — | — | 0.111 | 1.5 | 0.130 | 1.68 | 70.6 | 34.1 | 13.9 | 1.921 | 0.130 | 1.09 |

TABLE 4-continued

| | | phr | | | | | F2f | Adhesion | | | | | |
|---|---|---|---|---|---|---|---|---|---|---|---|---|---|
| Samples | BIIR | NR | SBR | MgO | ZnO | S | (kcycles) | 25 C. | 100 C. | $O_2$ perm. | Molar Ratio | $V_r$ | M100 (MPa) |
| 32 | 100 | — | — | 0.111 | 1.5 | 0.500 | 0.166 | 54.1 | 23.0 | 13.5 | 2.799 | 0.151 | 1.16 |
| 33 | 100 | — | — | 0.111 | 1.5 | 2.000 | 0.021 | 67.1 | 18.1 | 13.3 | 6.359 | 0.169 | 1.28 |

Samples 34-36

Three additional samples set forth in Table 5 were prepared using procedures similar to that set forth for samples 1-10 above. The level of zinc oxide was held at 1.5 pbw phr while magnesium oxide was varied for these samples. Testing was conducted using procedures that were also consistent with that set forth for samples 1-10 above.

TABLE 5

| | | phr | | | | | f2f | Adhesion | | | | | |
|---|---|---|---|---|---|---|---|---|---|---|---|---|---|
| Samples | BIIR | NR | SBR | MgO | ZnO | S | (kcycles) | 25 C. | 100 C. | $O_2$ perm. | Molar Ratio | $V_r$ | M100 (MPa) |
| 34 | 85 | 15 | — | 0.111 | 1.5 | 0.500 | 0.960 | 52.2 | 35.95 | 22.2 | 2.799 | 0.146 | 1.209 |
| 35 | 85 | 15 | — | 0.111 | 0.0 | 0.500 | 124.5 | 45.0 | 28.67 | 25.0 | 1.396 | 0.098 | 0.796 |
| 36 | 85 | 15 | — | 0.444 | 0.0 | 0.500 | 47.4 | 45.9 | 28.49 | 23.3 | 2.025 | 0.126 | 0.941 |

Various modifications and alterations that do not depart from the scope and spirit of this invention will become apparent to those skilled in the art. This invention is not to be duly limited to the illustrative embodiments set forth herein.

What is claimed is:

1. A method of preparing a green tire innerliner, the method comprising:
    mixing a rubber composition including a polymeric component and a curative to form a vulcanizable composition of matter, where the polymeric component consists of a halogenated poly(isobutylene-co-isoprene) copolymer and optionally one or more additional elastomers selected from the group consisting of natural rubber and poly(styrene-co-butadiene), where the curative includes sulfur, magnesium oxide, and zinc oxide, where the vulcanizable composition of matter comprises less than 0.75 parts by weight zinc oxide, per 100 parts by weight rubber, less than 0.75 parts by weight magnesium oxide, per 100 parts by weight rubber, and less than 0.75 parts by weight sulfur, per 100 parts by weight rubber, and where the total weight of the sulfur, zinc oxide, and magnesium oxide is less than 1.2 parts by weight per 100 parts by weight rubber; and
    extruding the vulcanizable composition of matter to form a green tire innerliner.

2. The method of claim 1, where the halogenated poly(isobutylene-co-isoprene) copolymer comprises from about 1 to about 3 percent by weight halogen, based upon the total weight of the halogenated poly(isobutylene-co-isoprene) copolymer.

3. The method of claim 1, where the vulcanizable composition includes less than 0.55 parts by weight sulfur per 100 parts by weight rubber.

4. The method of claim 1, where the vulcanizable composition includes less than 0.5 parts by weight magnesium oxide per 100 parts by weight rubber.

5. The method of claim 1, further comprising the step of building a green tire by employing the green tire innerliner.

6. The method of claim 5, further comprising the step of curing the green tire.

7. The method of claim 1, where the vulcanizable composition further comprises a filler.

8. The method of claim 7, where the vulcanizable composition comprises from about 30 to about 100 parts by weight of filler per hundred parts rubber.

9. The method of claim 1, where the polymeric component comprises from about 5 to about 40 percent by weight natural rubber, based upon the total weight of the polymeric component.

10. The method of claim 1, where the vulcanizable composition includes from about 0.05 to about 1.1 parts by weight total curative per 100 parts rubber.

11. The method of claim 1, where the halogenated poly(isobutylene-co-isoprene) is brominated poly(isobutylene-co-isoprene).

12. A method of preparing a green tire innerliner, the method comprising:
    mixing a rubber composition including a polymeric component and a curative to form a vulcanizable composition of matter, where the polymeric component consists of a halogenated poly(isobutylene-co-isoprene) copolymer, and optionally one or more additional elastomers selected from the group consisting of natural rubber, and poly(styrene-co-butadiene), and where the curative includes sulfur, magnesium oxide, and zinc oxide, where the molar ratio of the total sulfur plus magnesium oxide plus zinc oxide to the moles of crosslinkable pairs on the halogenated poly(isobutylene-co-isoprene) copolymer is at least 0.05:1 up to 1.8:1; and
    extruding the vulcanizable composition of matter to form a green tire innerliner.

13. The method of claim 12, where the molar ratio of the total sulfur plus magnesium oxide plus zinc oxide to the moles of crosslinkable pairs on the halogenated poly(isobutylene-co-isoprene) copolymer is at least 0.1:1 up to 1.5:1.

14. The method of claim 12, where the vulcanizable composition includes from about 0.1 to about 0.75 parts by weight magnesium oxide per 100 parts rubber.

* * * * *